(12) United States Patent
Do et al.

(10) Patent No.: US 10,957,201 B2
(45) Date of Patent: Mar. 23, 2021

(54) SYSTEM AND METHOD FOR RELATIVE POSITIONING BASED SAFE AUTONOMOUS DRIVING

(71) Applicant: QUALCOMM Incorporated, San Diego, CA (US)

(72) Inventors: Ju-Yong Do, Cupertino, CA (US); Sai Pradeep Venkatraman, Santa Clara, CA (US); Meghna Agrawal, Cupertino, CA (US); Weihua Gao, San Jose, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 15/706,422

(22) Filed: Sep. 15, 2017

(65) Prior Publication Data

US 2019/0088135 A1 Mar. 21, 2019

(51) Int. Cl.
| | |
|---|---|
| *G08G 1/16* | (2006.01) |
| *G08G 1/01* | (2006.01) |
| *G08G 1/0967* | (2006.01) |
| *G08G 1/015* | (2006.01) |
| *B60W 30/095* | (2012.01) |
| *G08G 1/0965* | (2006.01) |

(Continued)

(52) U.S. Cl.
CPC .............. *G08G 1/166* (2013.01); *B60W 30/09* (2013.01); *B60W 30/0956* (2013.01); *G05D 1/0055* (2013.01); *G05D 1/0088* (2013.01); *G06K 9/00791* (2013.01); *G08G 1/015* (2013.01); *G08G 1/017* (2013.01); *G08G 1/0112* (2013.01); *G08G 1/0129* (2013.01); *G08G 1/0145* (2013.01); *G08G 1/0965* (2013.01); *G08G 1/096725* (2013.01); *G08G 1/096791* (2013.01); *G08G 1/163* (2013.01); *G08G 1/164* (2013.01); *B60K 2031/0016* (2013.01); *B60W 2754/10* (2020.02); *G05D 2201/0213* (2013.01); *G06T 2207/30236* (2013.01)

(58) Field of Classification Search
None
See application file for complete search history.

(56) References Cited

U.S. PATENT DOCUMENTS

| | | | |
|---|---|---|---|
| 8,605,947 | B2 | 12/2013 | Zhang et al. |
| 8,818,681 | B1 | 8/2014 | Dolgov et al. |

(Continued)

OTHER PUBLICATIONS

International Search Report and Written Opinion—PCT/US2018/050755—ISA/EPO—dated Jan. 8, 2019, 14 pp.

*Primary Examiner* — Jonathan M Dager
*Assistant Examiner* — Garrett F Evans
(74) *Attorney, Agent, or Firm* — Thien T. Nguyen (57) ABSTRACT

Disclosed is a method and apparatus for managing a driving plan of an autonomous vehicle. The method may include obtaining observations of a neighboring vehicle using one or more sensors of the autonomous vehicle. The method may also include classifying one or more behavioral driving characteristics of the neighboring vehicle based on the observations. Furthermore, the method may include updating the driving plan based on a classification of the one or more behavioral driving characteristics of the neighboring vehicle, and controlling one or more operations of the autonomous vehicle based on the updated driving plan.

30 Claims, 5 Drawing Sheets

(51) Int. Cl.
  *B60W 30/09*  (2012.01)
  *G05D 1/00*  (2006.01)
  *G06K 9/00*  (2006.01)
  *G08G 1/017*  (2006.01)
  *B60K 31/00*  (2006.01)

(56) References Cited

U.S. PATENT DOCUMENTS

| | | |
|---|---|---|
| 9,387,854 B1 | 7/2016 | Ferguson et al. |
| 9,946,531 B1* | 4/2018 | Fields ................ B60W 30/0956 |
| 2010/0205132 A1 | 8/2010 | Taguchi et al. |
| 2014/0236414 A1 | 8/2014 | Droz et al. |
| 2016/0357188 A1 | 12/2016 | Ansari |
| 2017/0050638 A1* | 2/2017 | Gordon ................ G05D 1/0289 |
| 2017/0097243 A1 | 4/2017 | Ricci |
| 2017/0123419 A1 | 5/2017 | Levinson et al. |
| 2017/0197643 A1 | 7/2017 | Gariepy et al. |
| 2018/0061253 A1* | 3/2018 | Hyun ................... G05D 1/0246 |
| 2018/0107942 A1* | 4/2018 | Jiang ................ G08G 1/096791 |
| 2018/0208195 A1* | 7/2018 | Hutcheson ........... G05D 1/0088 |
| 2018/0335785 A1* | 11/2018 | Miller ............... B60W 50/0098 |

\* cited by examiner

SYSTEM AND METHOD FOR RELATIVE POSITIONING BASED SAFE AUTONOMOUS DRIVING

FIELD

The subject matter disclosed herein relates generally to adaptively controlling a driving plan of an autonomous motor vehicle.

BACKGROUND

Autonomous motor vehicles, such as cars, trucks, trains, etc., are vehicles that have the ability to sense their own environment, and take one or more actions based on the sensing. For example, an autonomous vehicle's sensing can generate a model of its surrounding environment, including other vehicles, pedestrians, roadways, traffic signals, as well as other surrounding elements. Then based on identification of objects, relative positions, relative motions, and a planned travel route, the autonomous vehicle can slow down based on another vehicle's speed, stop at a red light, turn at an upcoming intersection, as well as take other actions.

Prevention and mitigation of traffic accidents with other vehicles, whether those other vehicles are fully autonomous, semi-autonomous, or legacy vehicles (e.g., controlled solely through human input), is a vital aspect of autonomous driving. However, due to the mixture of legacy cars and autonomous cars at different levels of driving capability, the complexity of traffic safety problems is expected to be exponentially increasing as it becomes more difficult to predict how cars with mixed levels of autonomous support will respond to the actions of other cars.

SUMMARY

The present disclosure is directed to managing a driving plan of an autonomous vehicle, substantially as shown in and/or described in connection with at least one of the figures, as set forth more completely in the claims.

In an exemplary embodiment, observations of a neighboring vehicle are obtained using one or more sensors of an autonomous vehicle. One or more behavioral driving characteristics of the neighboring vehicle may then be classified based on the observations. Then, the driving plan can be updated based on a classification of the one or more behavioral driving characteristics of the neighboring vehicle, and one or more operations of the autonomous vehicle controlled based on the updated driving plan.

In another exemplary embodiment, a system is utilized for managing a driving plan of an autonomous vehicle, where the system includes one or more sensors that obtain observations of a neighboring vehicle, a memory to store the observations, and one or more processors communicably coupled with the memory and the sensors. The one or more processors are used by the system to classify one or more behavioral driving characteristics of the neighboring vehicle based on the observations. Then based on a classification of the one or more behavioral driving characteristics of the neighboring vehicle, the one or more processors can update driving plan, so that one or more operations of the autonomous vehicle can be controlled based on the updated driving plan.

In another exemplary embodiment, an apparatus for managing a driving plan of an autonomous vehicle can include means for obtaining observations of a neighboring vehicle using one or more sensors of an autonomous vehicle, means for classifying one or more behavioral driving characteristics of the neighboring vehicle based on the observations, means for updating a driving plan based on a classification of the one or more behavioral driving characteristics of the neighboring vehicle, and means for controlling one or more operations of the autonomous vehicle based on the updated driving plan.

In yet another exemplary embodiment, a non-transitory computer readable storage medium that includes instructions, which when executed by a processor, cause the processor to perform operations for managing a driving plan of an autonomous vehicle. When performed, the operations can include obtaining observations of a neighboring vehicle using one or more sensors of an autonomous vehicle. One or more behavioral driving characteristics of the neighboring vehicle may then be classified based on the observations. Then, the driving plan can be updated based on a classification of the one or more behavioral driving characteristics of the neighboring vehicle, and one or more operations of the autonomous vehicle controlled based on the updated driving plan.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
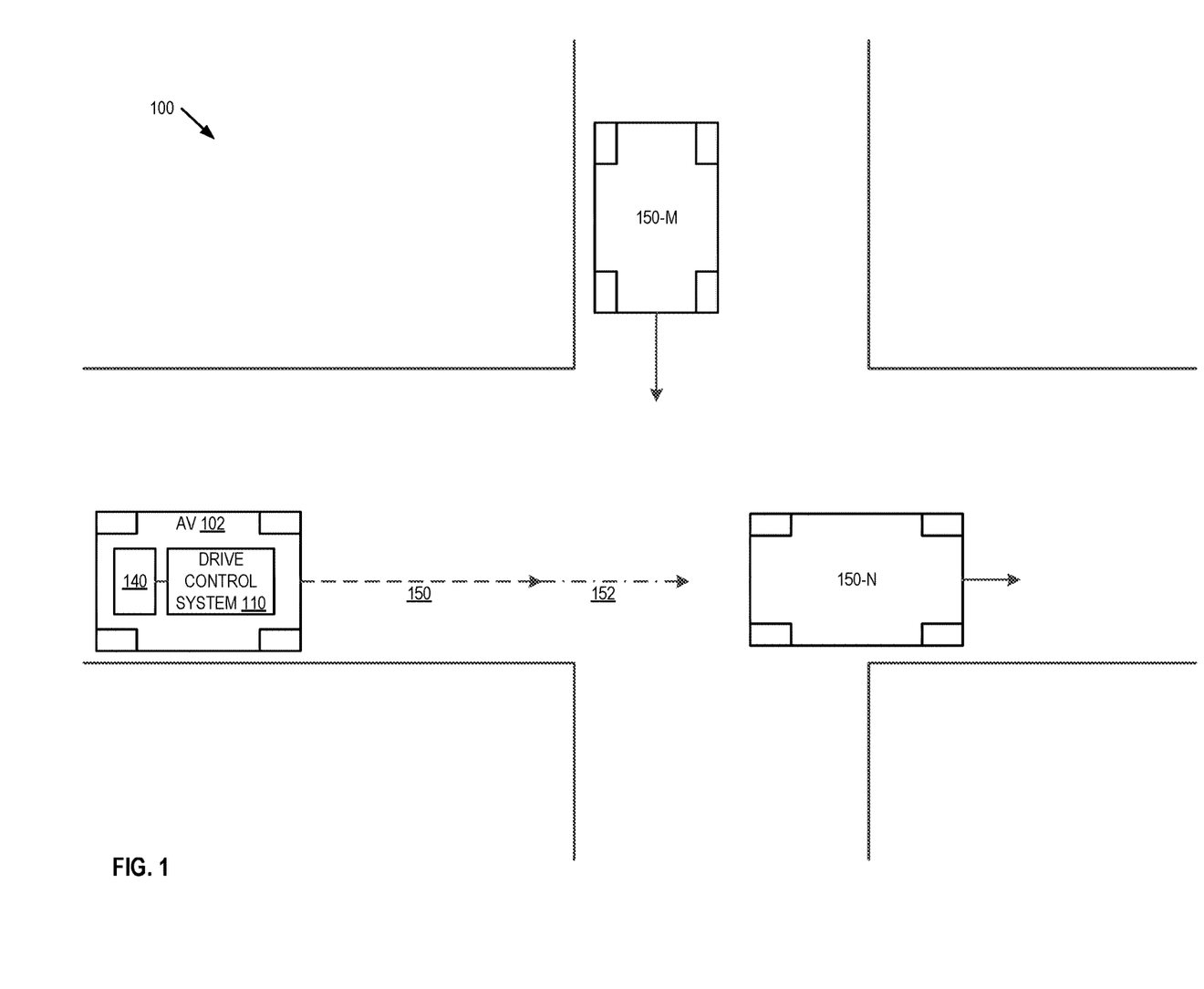
FIG. 1 is a block diagram of an exemplary system architecture for managing a driving plan of an autonomous vehicle.

FIG. 1 is a block diagram of an exemplary system architecture 100 for managing a driving plan of an autonomous vehicle. In embodiments discussed herein, safe autonomous driving is enabled based on one or more of relative positioning determinations, vehicle-to-vehicle communications, behavior modeling, as well as other factors discussed in greater detail herein.

In one embodiment, an autonomous vehicle 102, such as an autonomous car, truck, bus, etc. includes a drive control system 110. In one embodiment, the drive control system 110 is a computer processing system, which may include one or more processors, memory, I/O controllers, network interfaces, communication subsystems, displays, etc., as discussed in greater detail herein. Furthermore, drive control system 110 interfaces with propulsion, steering control, braking, and other systems of the autonomous vehicle, in order to control one or more movements of the motor vehicle.

In embodiments, the drive control system 110 controls the various autonomous vehicle systems, such as braking, steering, adjusting speed, etc., to implement a driving plan. The driving plan can include such factors as destination, route, waypoints, etc. that are used by the drive control system 110 to operate and navigate the autonomous vehicle 102 from an initial location to a destination. In embodiments, the driving plan 110 may be altered by the drive control system 110 based on observations of one or more vehicles (e.g., vehicle 150-M, vehicle 150-N, as well as other vehicles not illustrated) in proximity to the autonomous vehicle 102.

In one embodiment, drive control system 110 utilizes one or more sensors 140 of the autonomous vehicles 102, such as RADAR, LIDAR, global positioning system (GPS) data, radio ranging, one or more cameras, etc. to sense nearby vehicles over a period of time. In embodiments, the observations of the nearby vehicles enable drive control system 110 to classify the vehicles, including identifying vehicles as fully autonomous vehicles, partially autonomous vehicles, or legacy vehicles (e.g., containing no autonomous and/or driver assist systems). Based on the classifications, relative positions, and relative movements, drive control system 110 updates the drive plan and takes one or more actions. For example, autonomous vehicle 102 may be operating based on a drive plan by controlling the vehicle at a certain rate of speed along a certain route, as indicated by dashed line 150. Vehicles 150-M and 150-N are sensed within a certain threshold proximity to autonomous vehicle 102, and various observable vehicle characteristics are gathered by the sensors 140 (e.g., relative positions, relative velocities, relative accelerations, relative direction of movement, color of the vehicle, make and model of the vehicles, etc.). In one embodiment, drive control system 110 utilizes the observations to generate observable vehicle characteristics of the surrounding vehicles. In one embodiment, vehicles may also communicate directly with one another utilizing vehicle-to-vehicle (V2V) communications that transmit autonomous driving vehicle characteristics (e.g., partial, fully, or disabled autonomous driving, autonomous driving strategy as safe, sport, etc.), as well as other vehicle and/or driver characteristics.

In one embodiment, drive control system 110 utilizes a trained machine learning model that analyzes the observed vehicle characteristics (e.g., relative motion, relative direction, relative accelerations, visual vehicle characteristics, visual driver characteristics, exchanged V2V information, etc.) to classify behavioral driving characteristics of each observed vehicle. The trained machine learning model analysis enables drive control system 110 to determine whether nearby vehicles are at least partially autonomous, generate predicted behavioral driving characteristics of the vehicles (e.g., safe, aggressive, reckless, unpredictable, etc. classifications), as well as classifications of other behavioral driving characteristics for each observed vehicle.

In one embodiment, the trained machine learning model that drive control system 110 utilizes to classify the behavioral driving characteristics of each observed vehicle is obtained from an assistance data server (not shown). Based on the classifications, drive control system 110 can update the drive control plan of autonomous vehicle 102. For example, based on observations and/or V2V data exchange with vehicles 150-M and 150-N, drive control system 110 may determine that vehicle 150-M is a fully autonomous vehicle operating using a 'safe' driving strategy and operating as expected (e.g., based on such factors as observed relative speed, observed relative deceleration with respect to intersection 170, exchanged V2V information, maintaining constant speed and direction, etc.). However, drive control system 110 may determine that vehicle 150-N is a legacy vehicle based on irregular relative accelerations, lack of V2V data exchange, observed make and model of car, etc. Based on both sets of observations, drive control system 110 may then determine not to update its drive plan based on vehicle 150-M's observed behavioral driving characteristics, as vehicle 150-M is predicted to operate in a predictable and safe manner. Drive control system 110, however, may update its drive plan relative to the irregular behavioral driving characteristics of vehicle 150-N, causing autonomous vehicle 102 to slow down, increase a distance between autonomous vehicle 102 and vehicle 150-N, activate an emergency system (e.g., collision warning, brake support, etc.), with the updated drive plan indicated by dashed line 152.

In embodiments, drive control system 110 performs sensing of its surrounding environment on a periodic basis, such as every $1/60^{th}$ of a second, every $1/10^{th}$ of a second, etc., performs observations of surrounding vehicles, updates its drive plan, and takes actions according to the updated drive plan. In one embodiment, the periodic nature of the observations, surrounding vehicle characterizations, drive plan updates and implementation, enables autonomous vehicle 102 to operate in a safe and autonomous manner and continuously adjust and react to its environment. Beneficially, the periodic observation, characterization, and plan updating ensures responsive and safe adaptation regardless of whether surrounding vehicles are autonomous or legacy vehicles, and regardless of changes in patterns (e.g., an autonomous vehicle switching to manual driver controlled mode, an autonomous vehicle switching from safe to aggressive mode, encountering a new vehicle, changes in a legacy vehicles handling, erratic behaviors of a legacy vehicle, etc.).

In one embodiment, autonomous vehicle 102 transmits the sensor based observations of the surrounding vehicles (e.g., visual vehicle characteristics, motion based vehicle characteristics, V2V exchanged characteristics, etc.) to an assistance server. In embodiments, the reports are periodic (e.g., once per day, once per hour, at the end of each trip of autonomous vehicle 102, etc.). Furthermore, as discussed in greater detail below, the reports enable the assistance data server to generate a trained machine learning model of behavioral driving characteristics based on the observed vehicle characteristics, as well as to refine and update an existing machine learning model of behavioral driving characteristics that is based on new observations of autonomous vehicle 102.

Figure 2:
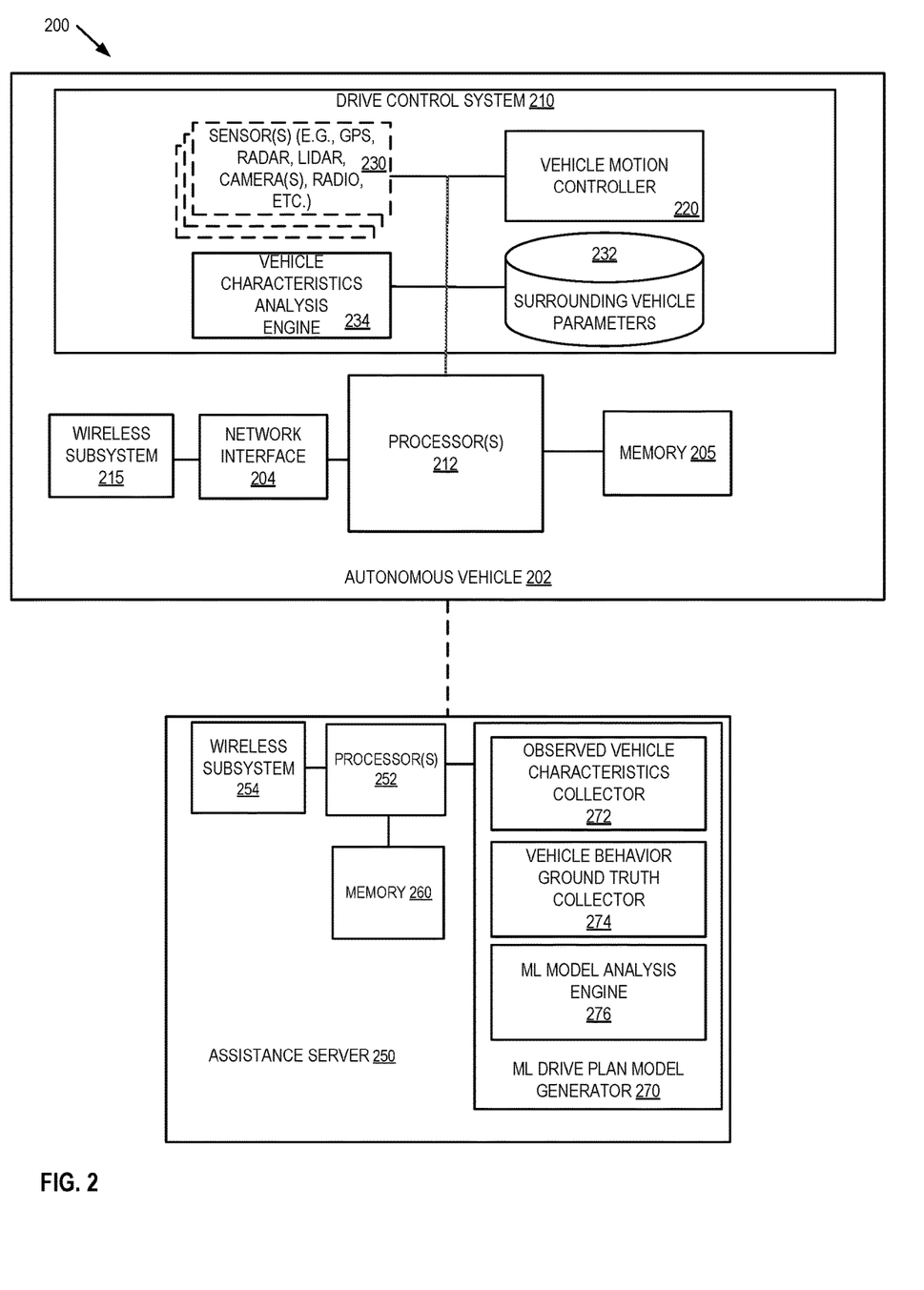
FIG. 2 is block diagram of one embodiment of a system including an autonomous vehicle and an assistance server.

FIG. 2 is block diagram of one embodiment of a system 200 including an autonomous vehicle and an assistance server. Autonomous vehicle 202 provides additional details for autonomous vehicle 102 discussed above in FIG. 1.

In one embodiment, autonomous vehicle 202 is a system, which may include one or more processor(s) 212, a memory 205, a network interface 204, and a wireless subsystem 215. It should be appreciated that autonomous vehicle 202 may also include, although not illustrated, a user and/or hardware interface, one or more power device(s) (e.g., vehicle battery, drive control system 210 battery, etc.), a propulsion system (e.g. an electric, gasoline, etc. powered motor), a steering system, a braking system, as well as other components typically associated with motor vehicles. Although only a single wireless subsystem 215 is illustrated, it is understood that network interface 204 may be capable of communicatively coupling autonomous vehicle 202 to any number of wireless subsystems (e.g., Bluetooth, WiFi, Cellular, or other networks) to transmit and receive data streams through a wireless link to/from a network.

In one embodiment, assistance server 250 is also a system, which may include one or more processor(s) 252, memory 260, and wireless subsystem 254. It should be appreciated that assistance server 250 may also include, although not illustrated, a user interface (e.g., keyboard, touch-screen, or similar devices), a power device (e.g., a battery), a display screen (e.g., an LCD display), as well as other components typically associated with computer processing systems.

In embodiments, the memories (e.g., memory 205 and memory 260) of autonomous vehicle 202 and assistance server 250 may be coupled to processor(s) to store instructions for execution by the processors, such as processor (s) 212 and processors 252. In some embodiments, the memory is non-transitory, and may store one or more processing modules. In one embodiment, memory 205 of autonomous vehicle 202 may store one or more processing modules of drive control system 210, such as surrounding vehicle characteristics engine 250, vehicle motion controller 270, interfaces to one or more sensor(s) 240 (e.g., GPS, RADAR, LIDAR, radio, camera(s), and other vehicle sensors), and a surrounding vehicle parameters 260 data store, to implement embodiments described herein. Furthermore, memory 260 of assistance server 250 may also include a machine learning (ML) drive plan model generator 270, including an observed vehicle characteristics collector 272, a vehicle behavior ground truth data collector 274, and a machine learning (ML) model analysis engine 276.

It should be appreciated that the embodiments as will be hereinafter described may be implemented through the execution of instructions, for example as stored in memory or other element, by processor(s) and/or other circuitry of autonomous vehicle 202 and assistance server 250. Particularly, circuitry of autonomous vehicle 202 and assistance server 250, including but not limited to processor(s) 212 and processor(s) 252 may operate under the control of a program, routine, or the execution of instructions to execute methods or processes in accordance with the aspects and features described herein. For example, such a program may be implemented in firmware or software (e.g. stored in memory 205 and/or memory 260) and may be implemented by processors, such as processor(s) 212 and processor(s) 252, and/or other circuitry. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines, or modules described herein may be performed by autonomous vehicle 202 itself and/or some or all of the functions, engines or modules described herein may be performed by another system connected through network interface 204 to autonomous vehicle 202. Thus, some and/or all of the functions may be performed by another system, and the results or intermediate calculations may be transferred back to autonomous vehicle 202. In some embodiments, such other device may comprise a server, such as assistance server 250 and/or another server (not shown). In some embodiments, the other device is configured to generate behavioral driving characteristics of nearby vehicles based on observations of autonomous vehicle 202, update an existing drive plan based on behavioral driving characteristics of nearby vehicles, and/or generate a new drive plan based on behavioral driving characteristics of nearby vehicles.

In one embodiment, autonomous vehicle 202 includes drive control system 210, which performs fully autonomous, partially autonomous, or legacy operations based on input of a user. In embodiments, legacy control of autonomous vehicle 202 can include a driver manually controlling a steering wheel, depressing an accelerator, depressing a brake, activating a traction control system, etc. Vehicle motion controller 220 responds to one or more of the driver inputs to control various vehicle operation systems (not shown) of autonomous vehicle, such as an engine, brakes, steering controls, etc. of autonomous vehicle.

In one embodiment, vehicle motion controller 220 of drive control system 210 may utilize a drive plan to control the one or more of the vehicle operation systems without the intervention of a user (e.g., full or partial autonomous vehicle control). As discussed herein, the drive plan can include a destination, waypoints, etc. that enable vehicle motion controller 220 to autonomously or partially autonomously navigate autonomous vehicle 202 according to the drive plan. In one embodiment, the autonomous and partially autonomous operation of autonomous vehicle 202 by vehicle motion controller 220 dynamically adapts to surrounding environmental factors, including neighboring vehicles (e.g., vehicles 150-M and 150-N illustrated in FIG. 1), roadway conditions, obstacles, etc., using a trained machine learning model.

In one embodiment, the trained machine learning model is received by autonomous vehicle 202 from assistance data server 250. As will be discussed in greater detail below, the trained machine learning model is generated using sensor based observations of observable vehicle characteristics, as well as vehicle-to-vehicle (V2V) communications indicating vehicle driving characteristics, received by assistance data server 250 from a plurality of different motor vehicles (autonomous, partially autonomous, or legacy vehicles). For example, autonomous vehicle 202 may capture a plurality of sensor based observations of vehicles that it encounters during a trip. In embodiments, sensors 230 of autonomous vehicle 202 can include various sensors including, but not limited to, global positioning system (GPS) sensors, RADAR sensors, LIDAR sensors, one or more cameras, a visual depth mapping system, radio receivers for performing radio ranging, etc. In embodiments, the sensor collected sensor data may be stored in surrounding vehicle parameters database 232. The sensor data collected by sensors 230 and stored in surrounding vehicle parameters database 232 are a rich collection of the observable characteristics of vehicles encountered by autonomous vehicle 202, such as relative positioning, relative speeds, relative accelerations, vehicle path tracking information (e.g., maintaining driving lane, ability to maintain regular path, irregular path, etc.). In embodiments, vehicle characteristics analysis engine 234 can include on or more machine learning models for pre-processing and/or analyzing the sensor data. For example, in addition to the trained machine learning drive plan model, vehicle characteristics analysis engine 234 may also include visual analysis models for performing one or image processing operations based on captured sensor image data, such as image matching to determine vehicle make and model of an observed neighboring vehicle, to distinguish a neighboring vehicle as a car, truck, motorcycle, bicycle, etc., to extract driver information such as driver identity, driver age, etc., as well as to extract other visual identifications that may be relevant to assistance data server 250. Furthermore, in embodiments, the collected sensor data can include information exchanged via vehicle-to-vehicle communication, such as exchanged make, model, vehicle motion controller software version, whether a vehicle is currently being operated in a legacy, partial, or fully autonomous mode, one or more characteristics of a drive plan being implemented, etc.

In one embodiment, autonomous vehicle 202 periodically reports collected sensor observations, vehicle-to-vehicle exchanged information, and any pre-processed sensor data associated with observed vehicles to assistance data server 250. Observed vehicle characteristics collector 272 of machine learning (ML) drive plan model generator 270 receives the reports from autonomous vehicle 202 and receives similar periodic reports from a plurality of other vehicles (autonomous and non-autonomous), and stores the reported data in memory 260. As indicated above, the reported information can include relative range data, relative speed data, relative acceleration data, vehicle-to-vehicle exchanged information, preprocessed or non-preprocessed image data, etc. that provide a rich source of observable vehicle characteristics while the associated vehicles are being operated (e.g., by drivers and/or by autonomous driving systems).

Vehicle behavior ground truth collector 274 further gathers objective driving behavior information. In one embodiment, public records reports, such as police reports (e.g., traffic violations by vehicle make and model, driver type, etc.) are a source of objective driving behavior information collected by behavior ground truth collector 274. For example, aggregated police reports may indicate that a certain make and model of car is associated with a higher percentage of traffic accidents per year, which is indicative of higher risk driving behaviors. Other sources of objective information, such as insurance organization statistical analysis associated with vehicles, including which vehicles are associated with more risky behaviors and higher insurance rates, can also be collected by behavior ground truth collector 274.

In one embodiment, machine learning (ML) model analysis engine 276 builds a classification model to characterize driving patterns (i.e., behavioral driving characteristics) from the sensor data collected from the plurality of different observation of the plurality of different reporting vehicles, and the collected objective driving behavior data. In other words, assistance data server 250 crowd sources the collection of actual observed driving behavior data (e.g., the collected sensor data, the V2V exchanged data, etc.). The collection of actual observed driving behavior data (e.g., relative irregular accelerations, relative irregular direction changes, zero or constant acceleration, holding a driving direction, etc.), along with any observed car features (e.g., car type, make, model, color, driver age, car age, passenger info, etc.), are used by ML model analysis engine 276 as input data and categories to a machine learning model, such as an artificial neural network. The objective driving behavior information (e.g., traffic reporting information, insurance and actuarial information, information derivable from these information sources such as accidents per year, etc.) is used as truth data by ML model analysis engine 276 when analyzing the input data. Then, the outputs of the machine learning model can be specified, such as driving risk patterns (e.g., safe, aggressive, reckless, unpredictable, etc.). After the inputs and outputs of the machine learning model are set, the collected sensor data may be fed into the machine learning model as training data to enable ML model analysis engine 276 to iteratively train the machine learning model using one or more machine learning model training techniques.

In one embodiment, the trained machine learning model is transmitted to autonomous vehicle 202, which stores the machine learning model in memory 205. Then, during autonomous driving (e.g., partial or fully autonomous) by the drive control system 210, vehicle characteristics analysis engine 234 may access the machine learning model. Furthermore, vehicle characteristics analysis engine 234 accesses one or more sensor readings of sensors 230, such as sensor readings associated with neighboring or nearby vehicle. The readings of sensors 230 are collected periodically (e.g., every $\frac{1}{60}^{th}$ of a second, every $\frac{1}{10}^{th}$ of a second, every second, continuously, etc.) and stored in surrounding vehicle parameters database 232. Analysis engine 234 can then periodically or continuously access the surrounding vehicle parameters database 232 and apply the sensor readings as input to the trained machine learning model. Based on the sensor readings, which are indicative of observable vehicle driving characteristics (e.g., irregular relative accelerations, constant relative speed maintenance, direction changes, regular reduction in velocity over time, etc.), vehicle characteristics analysis engine 234 is able to characterize or predict one or more behavioral driving characteristics of the neighboring vehicle (e.g., legacy operation, fully autonomous operation, lane change, braking, etc.). Then, based on the characterized behavior(s) of the neighboring vehicle, a drive plan being implemented by vehicle motion controller 220 may be updated when needed to address the characterized behavior(s).

For example, autonomous vehicle 202 may be implementing a drive plan with a neighboring vehicle traveling in front of autonomous vehicle 202. The sensor readings collected by sensors 230 may be collected and/or preprocessed to determine that the neighboring vehicle is a red sports car, which based on machine learning model analysis, may be indicative that the behaviors of the neighboring car will be risky and/or unpredictable. This predicted behavior of the neighboring vehicle could enable vehicle motion controller 220 to update a drive plan to a different state to, for example, to cause motion controller 220 to place more space in between autonomous vehicle 202 and the neighboring vehicle, change lanes, decelerate, reroute a travel plan, etc.

Continuing the above example, although the neighboring vehicles color and car type may be determined through pre-processing captured image sensor data and may be indicative of risky and/or unpredictable behavior based on machine learning model analysis, the machine learning model analysis of additional captured sensor data (e.g., RADAR, LIDAR, radio ranging, etc.) enables the detection of regular acceleration, constant speed maintenance, directional maintaining within a threshold percentage, etc., which can be indicative of autonomous operation of the neighboring car. The autonomous operation, which is detected based on the machine learning model analysis of the sensor data, may therefore override the neighboring vehicle's visual characteristics, so that the drive plan may be maintained and/or changed to reflect the autonomous operation of the nearby vehicle, such as closing a distance with the neighboring vehicle, maintaining a travel route, etc.

In additional to observable vehicle characteristics being analyzed in their totality, the observable characteristics can override otherwise erroneous or misleading information. For example, vehicle-to-vehicle data exchange can indicate to autonomous vehicle 202 that a neighboring vehicle is being controlled fully autonomously. However, the constant or periodic sensor reading collection and analysis by drive control system 210 enables drive control system 210 to detect that the drive has taken manual control, that the autonomous mode of the neighboring vehicle has changed (e.g., from safe to aggressive), etc. Beneficially, drive control system 210 can react and adapt to neighboring vehicles even when those vehicles unexpectedly change their driving behaviors.

As discussed herein, assistance server 250 periodically collects the observation, characterizations, predictions, and vehicle responses compared to the predictions/characterizations from autonomous vehicle 202, as well as other vehicles (not shown). In embodiments, other sources of data (e.g. truth data including traffic collision reports, traffic violation reports, etc.) may also be periodically collected by assistance server. In embodiments, the periodic collection of sensor data and truth data enables assistance server 200 to crowd source data regarding a vast array of driving patterns, vehicle makes, vehicle models, levels of autonomous driving, autonomous driving strategies applied by different vehicle manufacturers, association of automobile makes, and/models with collision reports and/or moving violations, etc. Furthermore, different localities (e.g., states, cities, rural areas, neighborhoods, school zones, etc.), times of day (e.g., commute time, nighttime, mid-day, etc.), traffic conditions (e.g., traffic jam, normal traffic, no traffic, etc.), roadway type (e.g., highway, city street, rural road, etc.), etc. may be associated with one or more sets of truth data and/or collected sensor data. In one embodiment, assistance server 200 generates sets of machine learning models, for example for use when autonomous vehicle 202 is operating during commute time in a city, for use when autonomous vehicle 202 is operating on a rural road with no traffic, etc., that are trained and relevant to specific conditions being experienced by autonomous vehicle 202.

In embodiments, the assistance data server 250 refines drive plan model(s) periodically using drive plan model generator 270 as new observation and/or truth data become available. The refined drive plan model(s) may then be provided back to autonomous vehicle 202 on a periodic basis (e.g., once per hour, at the start of a trip, at the end of a trip, when entering a new driving condition, etc.).

Figure 3:
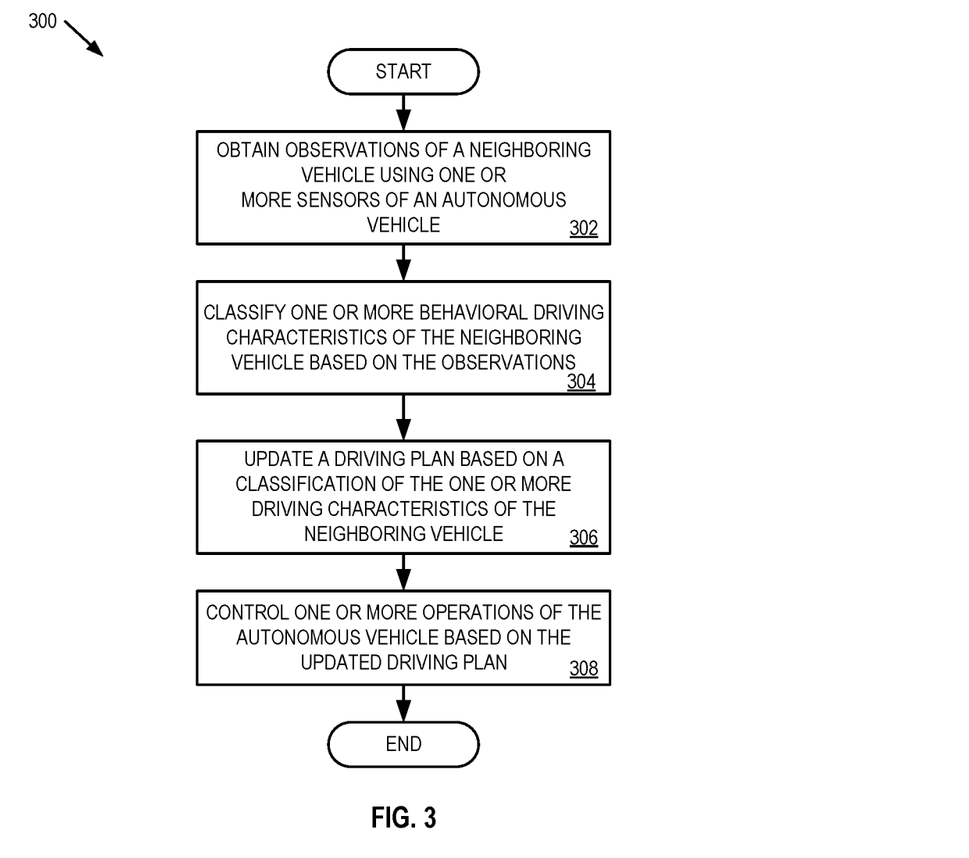
FIG. 3 is a flow diagram of one embodiment of a method for managing a driving plan of an autonomous vehicle.

FIG. 3 is a flow diagram of one embodiment of a method 300 for managing a driving plan of an autonomous vehicle. The method 300 is performed by processing logic that may comprise hardware (circuitry, dedicated logic, etc.), software (such as is run on a general purpose computer system or a dedicated machine), firmware, or a combination. In one embodiment, the method 300 is performed by an autonomous vehicle (e.g., by drive control system 110 of autonomous vehicle 102 or drive control system 210 of autonomous vehicle 202).

Referring to FIG. 3, processing logic begins by obtaining observations of a neighboring vehicle using one or more sensors of an autonomous vehicle (processing block 302). As discussed herein, processing logic collects sensor readings of nearby vehicles using one or more of a plurality of different sensor types, such as GPS sensors, RADAR sensors, LIDAR sensors, radio ranging sensors, camera(s), depth mapping systems, etc. Furthermore the sensor readings may be collected at a regular interval (e.g., once every $1/60^{th}$ of a second) and/or at an adaptive interval (e.g., at different intervals based on a number of neighboring vehicle, at interval and based on status/type of drive plan being implemented, etc.). Furthermore, the sensor readings are indicative of observable vehicle characteristics, such as acceleration, speed, direction, type of car, car color, driver, passenger status, etc.

Processing logic then classifies one or more behavioral driving characteristics of the neighboring vehicle based on the observations (processing block 304). In embodiments, processing logic utilizes the generated observations, such as the plurality of different sensor readings, as an input to a trained machine learning model that associates predicted driving characteristics with the sensor readings. Based on the classification of the one or more driving characteristics of the neighboring vehicle, processing logic updates a driving plan of the autonomous vehicle (processing block 306) and controls one or more operations of the autonomous vehicle based on the updated drive plan (processing block 308). The update may be to reset or change the mode of vehicle operation, such as changing from a normal drive plan to a safe/cautious drive plan (e.g., leaving more space between vehicles, changing lanes, changing routes, etc.), signaling a warning to a driver (e.g., a heads up display warning, a control panel warning, an audible warning, etc.), autonomously triggering one more vehicle systems (e.g., activating a vehicle-to-vehicle warning transmission, activating autonomous braking capabilities, triggering a car horn, etc.

Furthermore, where more than one neighboring car is present, the classification performed by processing logic can classify each neighboring car differently. Then, the drive plan can be updated to reflect a weighted average of the different predicted characteristics, such as weighting proximate vehicle behavioral characterizations more than distant vehicle behavioral characterizations, weighting more risky or unpredictable cars greater, etc., and adapting the drive plan based on a cumulative or individual analysis of each neighboring vehicle. For example, if a first neighboring vehicle is determined to be aggressive, and a second neighboring vehicle is determined to be safe, processing logic may determine to change lanes of the autonomous vehicle to follow the safe vehicle. As another example, if all neighboring vehicles are determined to be high risk, processing logic may determine to reroute the autonomous vehicle (e.g., take a different road, pull over, etc.) to avoid the neighboring vehicles altogether. As yet another example, based on the predicated behaviors of the neighboring vehicles, updating the drive plan can include generating a warning broadcast, such as a vehicle-to-vehicle communication, to nearby vehicles capable of receiving the communication to alert them to the determined characteristics of a neighboring vehicle.

Figure 4:
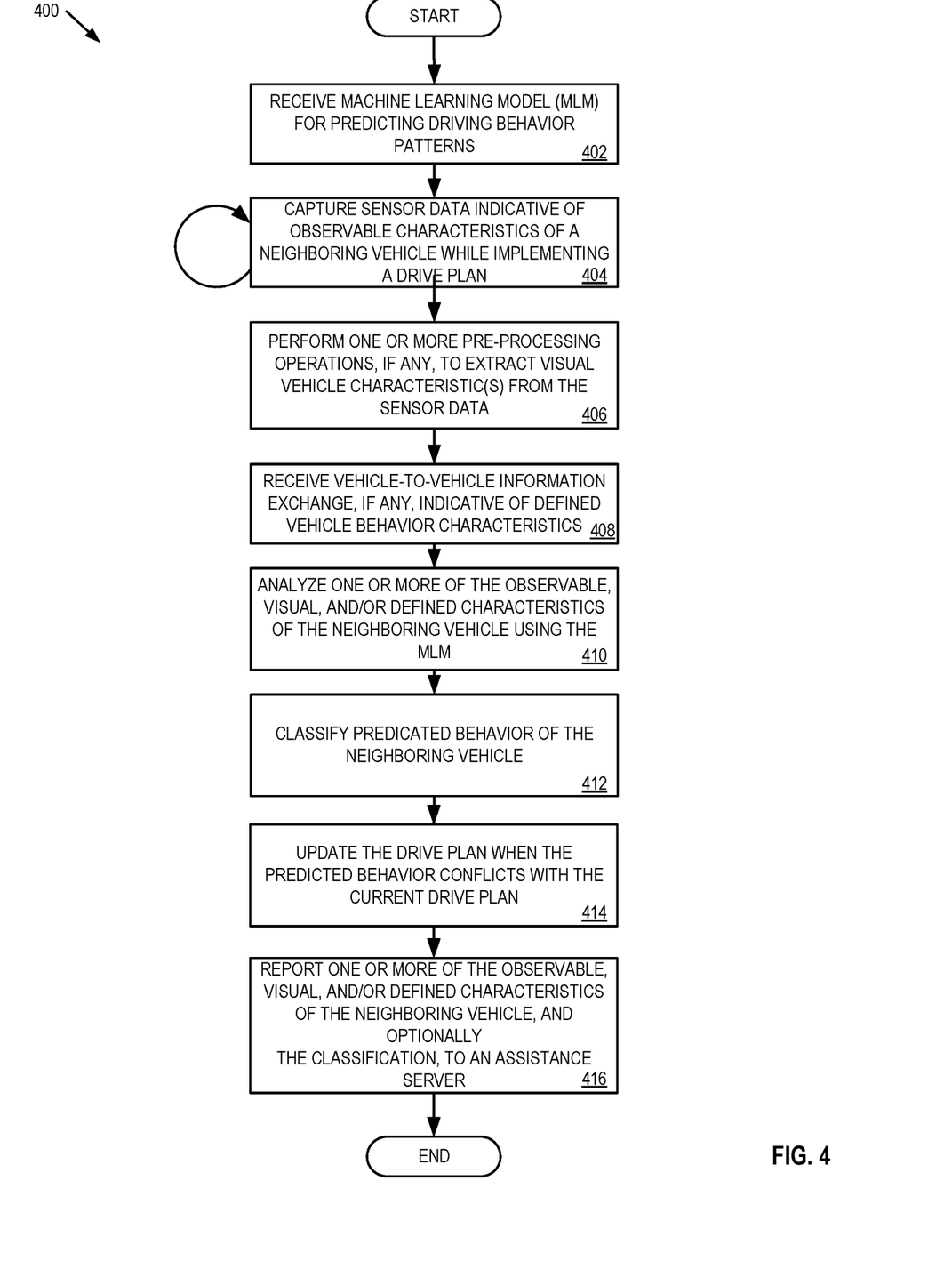
FIG. 4 is a flow diagram of another embodiment of a method for managing a driving plan of an autonomous vehicle.

FIG. 4 is a flow diagram of another embodiment of a method 400 for managing a driving plan of an autonomous vehicle. The method 400 is performed by processing logic that may comprise hardware (circuitry, dedicated logic, etc.), software (such as is run on a general purpose computer system or a dedicated machine), firmware, or a combination. In one embodiment, the method 400 is performed by an autonomous vehicle (e.g., by drive control system 110 of autonomous vehicle 102 or drive control system 210 of autonomous vehicle 202).

Referring to FIG. 4, processing logic begins by receiving a machine learning model (MLM) for predicting driving behavior patterns (processing block 402). The received MLM may be received by processing logic periodically, such as at the start of a trip, when an autonomous vehicle is connected to a communications network, upon receipt of a request from a driver, etc. Furthermore, more than one MLM may be received, where each MLM reflects different locations and/or driving conditions.

Then, while implementing a drive plan during partially or fully autonomous operation of the autonomous vehicle, processing logic captures sensor data indicative of observable characteristics of a neighboring vehicle (processing block 404). As discussed herein, a variety of sensors may be utilized by the autonomous vehicle to capture different types of data relevant to detecting behaviors of neighboring vehicles. In one embodiment, processing logic may perform one or more pre-processing operations, if any, to extract visual vehicle characteristic(s) from the sensor data (processing block 406). For example, camera data, depth sensor data (e.g., 3-D imaging), RADAR data, LIDAR data, etc. may be individually or collectively analyzed using a trained MLM image analysis tool to, for example, recognize vehicle makes, models, colors, perform facial recognition of drivers, read and/or recognize license plates, detect auxiliary vehicles (e.g., trailers hitched to vehicles), determine passenger status (e.g., child on board, full car, no passengers, etc.), as well as to make other visual characteristic assessments of neighboring vehicles.

Processing logic further, in embodiments, receives vehicle-to-vehicle (V2V) information exchange, if any, indicative of defined vehicle behavior characteristics (processing block 408). For example, neighboring vehicles with V2V communication capabilities, may transmit to nearby vehicles whether fully or partially autonomous driving is currently being used to control the vehicle, a vehicle make and mode, a vehicle identifier, a category of driving plan being implemented (e.g., safe, sport, aggressive, etc.), relevant driver and/or passenger information (e.g., new driver, impaired driver, number of passengers, baby on board warnings, etc.), as well as other information relevant to identifying specific vehicles and/or determine alleged behavior characteristics of neighboring vehicles.

Processing logic then analyzes one or more of the observable, visual, and/or defined characteristics of the neighboring vehicle using the received MLM (processing block 410). In embodiments, each source of information can be an input into the MLM, which enables processing logic to classify predicted behavior of the neighboring vehicle (processing block 412). Furthermore, certain sources of information, such as V2V broadcasted behaviors are not taken as truth, and are used as an input along with other sources of information (e.g., sensor information and/or visual information). Thus, usage of each type of information serves to cross check the other sources and/or enables processing logic to make a more accurate classification of driving behaviors. Furthermore, by utilize the different sources of information, processing logic's classification of a predicted nearby vehicles behavior can adapt in real time, or near real time, as updated sensor data is collected and is determined to indicate new/changed behaviors, as new V2V information is broadcast, as new vehicles are encountered, etc.

Processing logic utilizes the classification of the vehicles predicted behaviors to update the drive plan when the predicted behavior conflicts with the current drive plan (processing block 414). For example, a current drive plan can be a normal drive plan in which X meters separates the autonomous vehicle from a neighboring vehicle. However, if the neighboring vehicle begins to act erratically, a V2V information exchange informs of a change to legacy control, etc., the drive plan can be changed to, for example, a safe drive plan in which Y>X meters are used to separate the autonomous vehicle from a neighboring vehicle.

Processing logic then reports one or more of the observable, visual, and/or defined characteristics of the neighboring vehicle, and optionally the classification, to an assistance server (processing block 416). In embodiments, processing logic generates and transmits the reports to the assistance data server when, for example, a trip ends, when the autonomous vehicle is connected to a wireless communications network (e.g., a home network), periodically, after a certain amount of data has been collected, etc. The reports by processing logic, as well as the reports from a plurality of other vehicles, enable the assistance data server to generate, refine, and/or update one or more vehicle behavior prediction machine learning models, as discussed herein.

Figure 5:
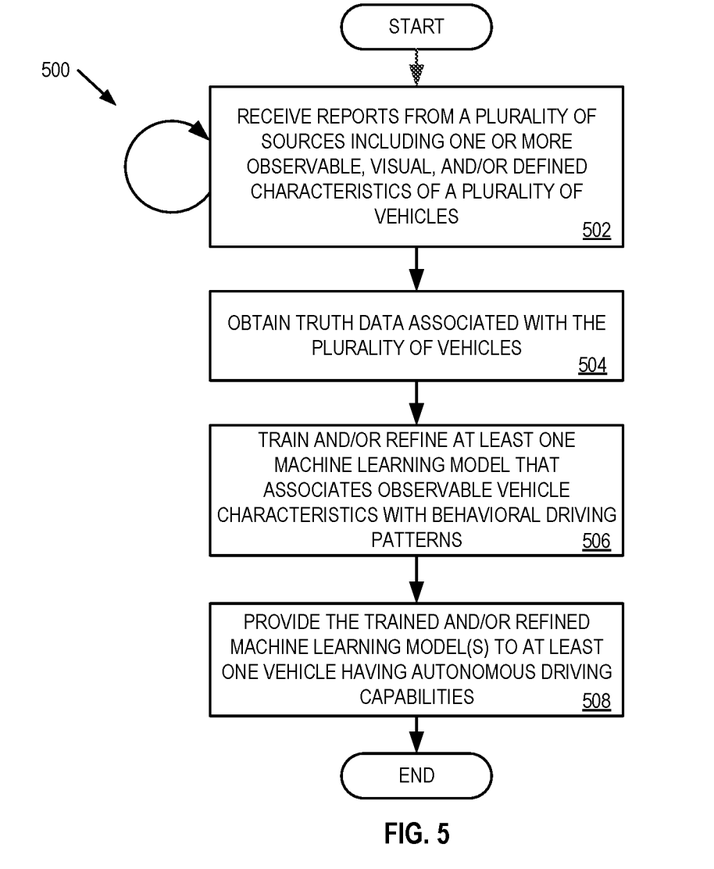
FIG. 5 is a flow diagram of one embodiment of a method for generating a machine learning model for predicting vehicle behaviors.

FIG. 5 is a flow diagram of one embodiment of a method 500 for generating a machine learning model for predicting vehicle behaviors. The method 500 is performed by processing logic that may comprise hardware (circuitry, dedicated logic, etc.), software (such as is run on a general purpose computer system or a dedicated machine), firmware, or a combination. In one embodiment, the method 500 is performed by a server computer processing system (e.g., assistance server 250).

Referring to FIG. 5, processing logic begins by receiving reports from a plurality of sources including one or more observable, visual, and/or defined characteristics of a plurality of vehicles (processing block 502). As discussed herein, a plurality of vehicles may collect sensor data, visual characteristics data, V2V information indicating defined behaviors, etc. that are indicative of behaviors of observed vehicles. Furthermore, other sources of information, such as traffic cameras, stationary or mobile senor arrays deployed on or near roadways, etc.

Processing logic also obtains truth data associated with the plurality of vehicles (processing block 504). The truth data, as discussed herein, is objective information indicative of vehicle behaviors. For example, moving violation reports, collision reports, insurance reporting information, and other collections that tie different vehicles to behaviors while driving, can be obtained by processing logic as truth data.

Processing logic then trains and/or refines at least one machine learning model that associates observable vehicle characteristics with behavioral driving patterns (processing block 506). That is, a machine learning model (MLM), such as an artificial neural network, can take as input the plurality of sensor reading types, visual characteristics, and defined behaviors as inputs to the MLM. Then, categories or values of predicted behaviors can be defined (e.g., safe, unpredictable, aggressive, etc.). Processing logic then iteratively trains the MLM using a machine learning technique based on the various inputs obtained at processing block 502 and associated truth data obtained at processing block 504. Furthermore, as discussed herein, one or more MLMs may be trained and/or refined to reflect the behavior associated with different locations, times, traffic conditions, etc.

Processing logic provide the trained and/or refined machine learning model(s) to at least one vehicle having autonomous driving capabilities (processing block 508). As discussed herein the MLM(s) may be provided on a periodic basis (e.g., upon vehicle startup, once a day, once a month, etc.), on demand (e.g., upon a vehicle operator's request), in response to sensed conditions (e.g., entering a new geographic area for which a specialized MLM is available), as well as in response to other conditions. Furthermore, and as discussed in greater detail above, an autonomous vehicle then utilizes the MLM(s) to control operations of the vehicle.

It should be appreciated that the autonomous vehicle discussed herein may communicate via one or more wireless communication links through a wireless network that are based on or otherwise support any suitable wireless communication technology. For example, the autonomous vehicle may associate with a network including a wireless network. In some aspects the network may comprise a local area network or a wide area network. Furthermore, the autonomous vehicle may support or otherwise use one or more of a variety of wireless communication technologies, protocols, or standards such as, for example, CDMA, TDMA, OFDM, OFDMA, WiMAX, and Wi-Fi. The autonomous vehicle may wirelessly communicate with other autonomous vehicle (e.g., using V2V communication protocols), devices, cell phones, other wired and wireless computers, Internet web-sites, assistance data servers, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the methods, systems, and apparatus of the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for managing a driving plan of an autonomous vehicle, comprising:
    obtaining observations of a neighboring vehicle using one or more sensors of the autonomous vehicle, the observations including observed driving behaviors of the neighboring vehicle;
    generating a driving risk pattern of the neighboring vehicle based on the observations;
    updating the driving plan based on the generated driving risk pattern of the neighboring vehicle; and
    controlling one or more operations of the autonomous vehicle based on the updated driving plan,
    wherein the generated driving risk pattern indicates one of a plurality of different risk levels,
    wherein generating the driving risk pattern of the neighboring vehicle comprises classifying the neighboring vehicle as a vehicle that lacks autonomous driving capability based on the observed driving behaviors of the neighboring vehicle, and
    wherein the generated driving risk pattern comprises a first classification indicating the neighboring vehicle as a vehicle lacking autonomous driving capability.

2. The method of claim 1, further comprising:
    determining a second classification of the neighboring vehicle based on vehicle characteristics of the neighboring vehicle exchanged in a vehicle to vehicle communication; and
    cross-checking the second classification against the first classification.

3. The method of claim 1, wherein the one or more sensors of the autonomous vehicle used to obtain the observations comprise a RADAR sensor, a LIDAR sensor, a GPS sensor, a proximity sensor, a visual sensor, or a combination thereof.

4. The method of claim 1, wherein the generated driving risk pattern is generated using a machine learning model.

5. The method of claim 1, wherein obtaining the observations comprises:
collecting, using the one or more sensors of the autonomous vehicle, one or more observable vehicle characteristics of the neighboring vehicle.

6. The method of claim 5, wherein the one or more observable vehicle characteristics of the neighboring vehicle collected by the one or more sensors comprise one or more relative accelerations of the neighboring vehicle, a relative speed of the neighboring vehicle, a relative direction of travel of the neighboring vehicle, one or more visual characteristics of the neighboring vehicle, one or more visual characteristics of a driver of the neighboring vehicle, or a combination thereof.

7. The method of claim 5, further comprising:
sending, to a server, the one or more observable vehicle characteristics of the neighboring vehicle.

8. The method of claim 7, further comprising:
sending, to the server, a plurality of observable vehicle characteristics associated with a plurality of observed vehicles collected by the autonomous vehicle; and
receiving, from the server, a machine learning model trained to identify behavioral characteristics from observable vehicle characteristics using the plurality of observable vehicle characteristics and associated known behavioral characteristics.

9. The method of claim 8, further comprising:
periodically sending, to the server, new observable vehicle characteristics associated with new observed vehicles collected by the autonomous vehicle; and
periodically receiving, from the server, an updated machine learning model.

10. The method of claim 1, wherein the autonomous vehicle is an autonomous car.

11. A system for managing a driving plan of an autonomous vehicle, the system comprising:
one or more sensors configured to obtain observations of a neighboring vehicle, the observations including observed driving behaviors of the neighboring vehicle;
a memory configured to store the observations; and
one or more processors communicably coupled with the memory and the sensors, the one or more processors configured to:
generate a driving risk pattern of the neighboring vehicle based on the observations,
update the driving plan based on the generated driving risk pattern of the neighboring vehicle, and
control one or more operations of the autonomous vehicle based on the updated driving plan,
wherein the generated driving risk pattern indicates one of a plurality of different risk levels,
wherein the one or more processors configured to generate the driving risk pattern of the neighboring vehicle are configured to classify the neighboring vehicle as a vehicle that lacks autonomous driving capability based on the observed driving behaviors of the neighboring vehicle, and
wherein the generated driving risk pattern comprises a first classification indicating the neighboring vehicle as a vehicle lacking autonomous driving capability.

12. The system of claim 11, wherein the one or more processors are further configured to:
determine a second classification of the neighboring vehicle based on vehicle characteristics of the neighboring vehicle exchanged in a vehicle to vehicle communication; and
cross-check the second classification against the first classification.

13. The system of claim 11, wherein the one or more sensors used to obtain the observations comprise a RADAR sensor, a LIDAR sensor, a GPS sensor, a proximity sensor, a visual sensor, or a combination thereof.

14. The system of claim 11, wherein the one or more processors are further configured to use a machine learning model to generate the driving risk pattern of the neighboring vehicle.

15. The system of claim 11, further wherein the one or more sensors are configured to:
collect, using the one or more sensors of the autonomous vehicle, one or more observable vehicle characteristics of the neighboring vehicle.

16. The system of claim 15, wherein the one or more observable vehicle characteristics of the neighboring vehicle collected by the one or more sensors comprise one or more relative accelerations of the neighboring vehicle, a relative speed of the neighboring vehicle, a relative direction of travel of the neighboring vehicle, one or more visual characteristics of the neighboring vehicle, one or more visual characteristics of a driver of the neighboring vehicle, or a combination thereof.

17. The system of claim 15, further comprising:
a wireless subsystem configured to send to a server the one or more observable vehicle characteristics of the neighboring vehicle.

18. The system of claim 17, wherein the wireless subsystem is further configured to:
send a plurality of observable vehicle characteristics associated with a plurality of observed vehicles to the server; and
receive, from the server, a machine learning model trained to identify behavioral characteristics from observable vehicle characteristics using the plurality of observable vehicle characteristics and associated known behavioral characteristics.

19. The system of claim 18, wherein the wireless subsystem is further configured to:
periodically send, to the server, new observable vehicle characteristics associated with new observed vehicles collected by the autonomous vehicle; and
periodically receive, from the server, an updated machine learning model.

20. The system of claim 11, wherein the autonomous vehicle is an autonomous car.

21. A non-transitory computer readable storage medium including instructions that, when executed by a processor, cause the processor to perform operations for managing a driving plan of an autonomous vehicle, the operations comprising:
obtaining observations of a neighboring vehicle using one or more sensors of the autonomous vehicle, the observations including observed driving behaviors of the neighboring vehicle;
generating a driving risk pattern of the neighboring vehicle based on the observations;
updating the driving plan based on the generated driving risk pattern of the neighboring vehicle; and
controlling one or more operations of the autonomous vehicle based on the updated driving plan, wherein the generated driving risk pattern indicates one of a plurality of different risk levels, wherein generating the driving risk pattern of the neighboring vehicle comprises classifying the neighboring vehicle as a vehicle that lacks autonomous driving capability based on the observed driving behaviors of the neighboring vehicle, and wherein the generated driving risk pattern comprises a first classification indicating the neighboring vehicle as a vehicle lacking autonomous driving capability.

22. The non-transitory computer readable storage medium of claim 21, wherein the operations further comprise:

determining a second classification of the neighboring vehicle based on vehicle characteristics of the neighboring vehicle exchanged in a vehicle to vehicle communication; and cross-checking the second classification against the first classification.

23. The non-transitory computer readable storage medium of claim 21, wherein obtaining the observations comprises:

collecting, using the one or more sensors of the autonomous vehicle, one or more observable vehicle characteristics of the neighboring vehicle; and sending to a server the one or more observable vehicle characteristics of the neighboring vehicle.

24. An apparatus, comprising:

means for obtaining observations of a neighboring vehicle using one or more sensors of an autonomous vehicle, the observations including observed driving behaviors of the neighboring vehicle;

means for generating a driving risk pattern of the neighboring vehicle based on the observations;

means for updating a driving plan based on the generated driving risk pattern of the neighboring vehicle; and means for controlling one or more operations of the autonomous vehicle based on the updated driving plan, wherein the generated driving risk pattern indicates one of a plurality of different risk levels, wherein the means for generating the driving risk pattern of the neighboring vehicle comprises means for classifying the neighboring vehicle as a vehicle that lacks autonomous driving capability based on the observed driving behaviors of the neighboring vehicle, and wherein the generated driving risk pattern comprises a first classification indicating the neighboring vehicle as a vehicle lacking autonomous driving capability.

25. The apparatus of claim 24, further comprising:

means for determining a second classification of the neighboring vehicle based on vehicle characteristics of the neighboring vehicle exchanged in a vehicle to vehicle communication; and means for cross-checking the second classification against the first classification.

26. The apparatus of claim 24, wherein the means for obtaining the observations comprises:

means for collecting, using the one or more sensors of the autonomous vehicle, one or more observable vehicle characteristics of the neighboring vehicle; and means for sending, to a server, the one or more observable vehicle characteristics of the neighboring vehicle.

27. The method of claim 1, further comprising:

obtaining observations of a second neighboring vehicle;

generating a second driving risk pattern of the second neighboring vehicle based on the observations of the second neighboring vehicle; and updating the driving plan based on a weight average of the driving risk pattern of the neighboring vehicle and the second driving risk pattern of the second neighboring vehicle.

28. The method of claim 1, further comprising:

determining a second classification of the neighboring vehicle based on observed visual characteristics of the neighboring vehicle; and cross-checking the second classification against the first classification.

29. The method of claim 1, wherein the observed driving behaviors comprise at least one of a relative speed, a relative acceleration, a relative deceleration, a relative position, or relative direction changes of the neighboring vehicle.

30. The method of claim 4, wherein the machine learning model uses objective driving behavior information as truth data to analyze the observations.

* * * * *